US012683826B2

(12) United States Patent
Wang et al.

(10) Patent No.: US 12,683,826 B2
(45) Date of Patent: Jul. 14, 2026

(54) METHOD FOR IMPROVING RELIABILITY OF MBS SERVICE AND NETWORK DEVICE

(71) Applicant: GUANGDONG OPPO MOBILE TELECOMMUNICATIONS CORP., LTD., Dongguan (CN)

(72) Inventors: Shukun Wang, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 578 days.

(21) Appl. No.: 18/317,658

(22) Filed: May 15, 2023

(65) Prior Publication Data

US 2023/0283498 A1     Sep. 7, 2023

Related U.S. Application Data

(63) Continuation of application No. PCT/CN2021/082195, filed on Mar. 22, 2021.

(51) Int. Cl.
*H04L 12/18*          (2006.01)
(52) U.S. Cl.
CPC ...... *H04L 12/1868* (2013.01); *H04L 12/1881* (2013.01); *H04L 12/189* (2013.01)
(58) Field of Classification Search
None
See application file for complete search history.

(56) References Cited

U.S. PATENT DOCUMENTS

| | | | |
|---|---|---|---|
| 2012/0155269 A1* | 6/2012 | Kim ................... | H04L 43/0882 |
| | | | 370/235 |
| 2021/0075631 A1 | 3/2021 | Liao | |
| 2022/0216946 A1* | 7/2022 | Liu ..................... | H04L 1/1867 |
| 2023/0019024 A1* | 1/2023 | Stare ................... | H04W 72/30 |
| 2024/0187272 A1* | 6/2024 | Yoshioka ............. | H04L 1/1896 |

FOREIGN PATENT DOCUMENTS

| | | |
|---|---|---|
| CN | 1627725 A | 6/2005 |
| CN | 101056186 A | 10/2007 |
| CN | 101883325 A | 11/2010 |
| CN | 106470398 | 3/2017 |
| CN | 109588059 | 4/2019 |
| CN | 112385269 | 2/2021 |

(Continued)

OTHER PUBLICATIONS

Huawei, "New Work Item on NR support of Multicast and Broadcast Services," 3GPP TSG RAN Meeting #86 RP-193248, Sitges, Spain, Dec. 9-12, 2019.

(Continued)

*Primary Examiner* — Angela Nguyen
(74) *Attorney, Agent, or Firm* — Hodgson Russ LLP

(57)          ABSTRACT

A method and an apparatus for improving reliability of multicast broadcast service (MBS) service, a terminal device, and a network device are provided. The method includes the following. A terminal device determines a transmission mode of an MBS service. The terminal device determines, based on the transmission mode of the MBS service, whether a first transmission is new transmission or is retransmission.

12 Claims, 7 Drawing Sheets

(56) References Cited

FOREIGN PATENT DOCUMENTS

JP          2002368684  A      12/2002

OTHER PUBLICATIONS

3rd Generation Partnership Project, "Technical Specification 3rd Generation Partnership Project; Technical Specification Group Radio Access Network; NR; Medium Access Control (MAC) protocol specification," 3GPP TS 38.321, Dec. 2020, V16.3.0, Release 16.

Mediatek Inc., "HARQ operation to improve reliability for PTM transmission," 3GPP TSG-RAN WG2 Meeting #113 R2-2100172, Jan. 25-Feb. 5, 2021.

LG Electronics Inc., "Support of group scheduling for RRC_ CONNECTED UEs," 3GPP TSG RAN WG1 Meeting #104-e R1-2100906, Jan. 25-Feb. 5, 2021.

WIPO, International Search Report and Written Opinion for International Application No. PCT/CN2021/082195, Oct. 8, 2021.

EPO, Extended European Search Report for EP Application No. 21932047.0, Jan. 31, 2024.

CNIPA, First Office Action for CN Application No. 202180074715. X, Sep. 26, 2024.

\* cited by examiner

100

110

120                    120

301

DETERMINE, BY TERMINAL DEVICE, TRANSMISSION MODE OF MBS SERVICE

302

DETERMINE, BY TERMINAL DEVICE, WHETHER FIRST TRANSMISSION IS NEW
TRANSMISSION OR RETRANSMISSION, BASED ON TRANSMISSION MODE OF MBS
SERVICE

QoS FLOW OF PDU SESSION
OF MBS SERVICE

... ...

SDAP

PDCP          ...          PDCP

RLC           ...          RLC

MAC

PHY 1                          PHY 2

PTM                                  PTP

METHOD FOR IMPROVING RELIABILITY OF MBS SERVICE AND NETWORK DEVICE

CROSS-REFERENCE TO RELATED APPLICATION(S)

This application is a continuation of International Application No. PCT/CN2021/082195, filed Mar. 22, 2021, the entire disclosure of which is incorporated herein by reference.

TECHNICAL FIELD

Implementations of this disclosure relate to the field of mobile communication technology, and more particularly to a method and an apparatus for improving reliability of multicast broadcast service (MB S) service, a terminal device, and a network device.

BACKGROUND

In a new radio (NR) system, a multicast broadcast service (MBS) service is supported. A terminal device can receive the multicast MB S service in a radio resource control (RRC) connected state. The multicast MBS service usually has relatively high requirements on reliability. How to ensure high reliability of the MBS service needs to be clarified.

SUMMARY

Implementations of the disclosure provide a method for improving reliability of multicast broadcast service (MBS) service and a network device.

A method for improving reliability of MBS service provided in implementations of the disclosure includes the following. A terminal device determines a transmission mode of an MBS service. The terminal device determines, based on the transmission mode of the MBS service, whether a first transmission is new transmission or is retransmission.

A method for improving reliability of MBS service provided in implementations of the disclosure includes the following. A network device determines that a transmission mode of an MBS service is: new transmission is transmitted in a point to multipoint (PTM) mode, and retransmission is transmitted in a point to point (PTP) mode. The network device schedules transmission of the MBS service based on the transmission mode of the MBS service.

A network device provided in implementations of the disclosure includes a transceiver, a processor, and a memory. The memory is configured to store computer programs. The processor is configured to invoke and execute the computer programs stored in the memory, to implement the method described above.

BRIEF DESCRIPTION OF THE DRAWINGS

The accompanying drawings described herein are intended for further understanding of the disclosure and constitute a part of the disclosure. Exemplary implementations of the disclosure as well as elaborations thereof are intended for explaining the disclosure rather than limiting the disclosure. In the drawings.

DETAILED DESCRIPTION

The following will describe technical solutions of implementations of the disclosure with reference to the accompanying drawings in the implementations of the disclosure. Apparently, implementations described herein are merely some implementations, rather than all implementations, of the disclosure. Based on the implementations of the disclosure described herein, all other implementations obtained by those of ordinary skill in the art without creative effort shall fall within the protection scope of the disclosure.

The technical solutions of implementations of the disclosure are applicable to various communication systems, for example, a long term evolution (LTE) system, an LTE frequency division duplex (LTE-FDD) system, an LTE time division duplex (LTE-TDD) system, a 5th generation (5G) system, or future communication systems, etc.

Figure 1:
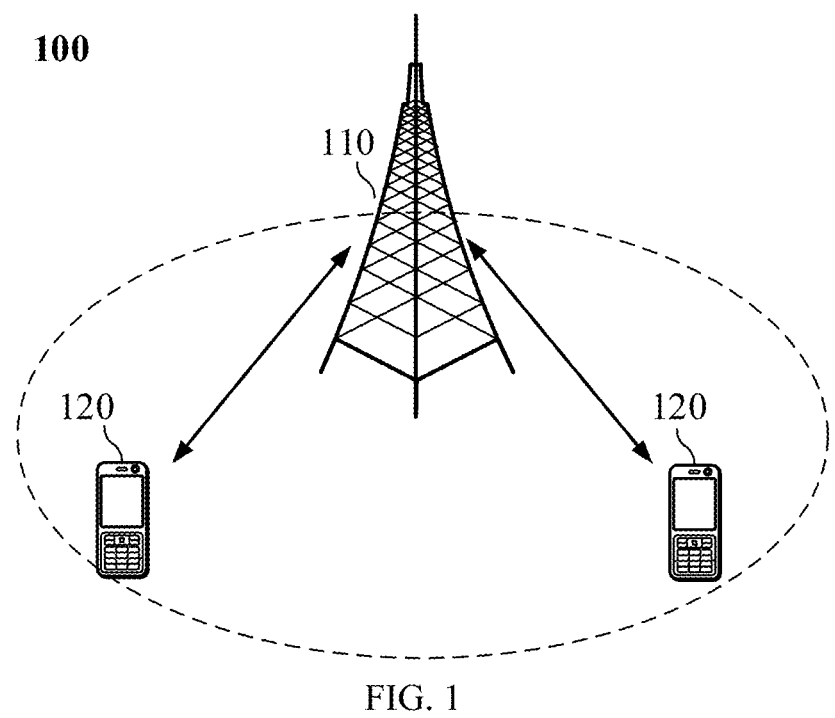
FIG. 1 is a schematic architectural diagram of a communication system provided in implementations of the disclosure.

Exemplarily, FIG. 1 illustrates a communication system 100 to which implementations of the disclosure are applicable. The communication system 100 may include a network device 110. The network device 110 may be a device that can communicate with a terminal 120 (also referred to as "communication terminal" or "terminal"). The network device 110 can provide a communication coverage for a specific geographical area and communicate with terminals in the coverage area. Optionally, the network device 110 may be an evolutional Node B (eNB or eNodeB) in an LTE system, or a radio controller in a cloud radio access network (CRAN), or the network device may be a mobile switching center, a relay station, an access point, an in-vehicle device, a wearable device, a hub, a switch, a bridge, a router, a network-side device in a 5G network, or a network device in a future communication system, etc.

The communication system 100 further includes at least one terminal 120 located in the coverage area of the network device 110. The "terminal" referred to herein can include but is not limited to a device configured to communicate via a wired line, another data connection/network, a wireless interface, a device which is part of another terminal and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and a conventional laptop and/or a handheld receiver, or other electronic devices equipped with radio telephone receiver. The terminal may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a device with wireless communication functions such as a handheld device, a computing device, other processing devices coupled with a wireless modem, an in-vehicle device, and a wearable device, a terminal in a 5G network, a terminal in the future evolved public land mobile network (PLMN), etc.

Optionally, terminals 120 can communicate with each other through device to device (D2D) communication.

Optionally, the 5G system or 5G network can also be referred to as a new radio (NR) system or NR network.

FIG. 1 exemplarily illustrates one network device and two terminals. Optionally, the communication system 100 may also include multiple network devices, and there can be other numbers of terminals in a coverage area of each of the network devices, and implementations of the disclosure are not limited in this regard.

Optionally, the communication system 100 may further include other network entities such as a network controller, a mobile management entity, or the like, and implementations of the disclosure are not limited in this regard.

It should be understood that, according to implementations of the disclosure, a device with communication functions in a network/system can be referred to as a "communication device". Taking the communication system 100 illustrated in FIG. 1 as an example, the communication device may include the network device 110 and the terminal(s) 120 that have communication functions. The network device 110 and the terminal(s) 120 can be the devices described above and will not be described in detail again herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

In order for better understanding of technical solutions of implementations of the disclosure, technical solutions related to the implementations of the disclosure will be elaborated below.

With people's pursuit of speed, delay, high-speed mobility, and energy efficiency, as well as diversity and complexity of business in future life, the $3^{rd}$ generation partnership project (3GPP) international standard organization began to research and develop 5G. 5G is mainly applied to enhanced mobile broadband (eMBB), ultra-reliable low-latency communications (URLLC), massive machine-type communications (mMTC).

On one hand, eMBB aims to obtain multimedia content, services, and data for users and grows rapidly in business demands. On the other hand, because eMBB may be deployed in different scenarios, such as indoor, urban, rural, etc., its capabilities and requirements vary widely, and it is necessary to analyze in combination with specific deployment scenarios. URLLC is typically applied to industrial automation, power automation, telemedicine operations, and traffic safety assurance, etc. mMTC is typically characterized by high connection density, small amount of data, delay-insensitive services, low cost of modules, and long service life, etc.

During early deployment of NR, it is difficult to implement complete NR coverage, and thus typically, wide-area LTE coverage and an NR island coverage mode are applied for network coverage. In addition, LTE is mostly deployed below 6 gigahertz (GHz), leaving few spectrums for 5G below 6 GHz, so research on application of spectrums above 6 GHz for NR is required. However, the high band is limited in coverage and fast in signal fading. Meanwhile, in order for protecting early LTE investment of mobile operating companies, a working mode of tight interworking between LTE and NR is proposed.

Radio Resource Control (RRC) State

In $5^{th}$ generation (5G), a new RRC state, namely an RRC_INACTIVE state, has been defined in order to reduce air interface signaling, achieve fast radio connection recovery, and achieve fast data service recovery. This state is different from an RRC_IDLE state and an RRC ACTIVE state.

1) RRC_IDLE state ("idle state" for short): Mobility is based on cell selection and re-selection of a UE. Paging is initiated by a core network (CN), and a paging area is configured by the CN. The base-station side does not have any UE context or RRC connection.

2) RRC_CONNECTED state ("connected state" for short): There is an RRC connection. Both the base-station side and a UE side have UE context. A network side knows that a location of the UE is cell level-based. Mobility is controlled by the network side. Unicast data can be transferred between the UE and a base station.

3) RRC_INACTIVE state ("inactive state" for short): Mobility is based on cell selection and re-selection of the UE. There is a CN-NR connection. Some base station has UE context. Paging is triggered by a radio access network (RAN), a RAN-based paging area is managed by the RAN, and the network side knows that the location of the UE is RAN-based paging area level.

Multimedia Broadcast Multicast Service (MBMS)

MBMS is a technology for transferring data from one data source to multiple terminal devices on a shared network resource. With this technology, it is possible to realize efficient utilization of network resources in addition to providing multimedia services, and realize broadcast and multicast of multimedia services of relatively high rate (such as 256 kilobits per second (kbps)).

Due to low spectral efficiency, it is hard for MBMS to support operation of mobile TV services effectively. Therefore, in LTE, the $3^{rd}$ generation partnership project (3GPP) has explicitly proposed to enhance capability of supporting downlink (DL) high-rate MBMS services, and has specified design requirements on physical layer and air interface.

In 3GPP release 9 (R9), an evolved MBMS (eMBMS) is introduced to LTE. In eMBMS, the concept of single frequency network (SFN), i.e. MBMS SFN (MBSFN), is proposed. In MBSFN, all cells transmit data at the same time by utilizing the same frequency while ensuring synchronization between cells. In this mode, it is possible to greatly improve an overall signal-to-noise ratio distribution of the cell, thereby greatly improving spectral efficiency. In eMBMS, broadcast and multicast of services are implemented based on an internet protocol (IP) multicast protocol.

In LTE or LTE-advanced (LTE-A), MBMS supports only a broadcast bearer mode but does not support a multicast bearer mode. In addition, MBMS service reception is applicable to a terminal device in an idle state or a connected state.

In 3GPP R13, the concept of single cell point-to-multipoint (SC-PTM) is introduced, and SC-PTM is based on an MBMS network architecture.

In MBMS, a new logical channel is introduced, where the new logical channel includes a single cell-multicast control channel (SC-MCCH) and a single cell-multicast transport channel (SC-MTCH). The SC-MCCH and the SC-MTCH are mapped onto a downlink-shared channel (DL-SCH), and then the DL-SCH is mapped onto a physical downlink shared channel (PDSCH). The SC-MCCH and the SC-MTCH each are a logical channel, the DL-SCH is a transport channel, and the PDSCH is a physical channel. The SC-MCCH and the SC-MTCH do not support hybrid automatic repeat request (HARD) operations.

In MBMS, a new system information block (SIB) type, i.e. SIB20, is introduced. Specifically, configuration information of the SC-MCCH is transmitted via SIB20, and one cell has only one SC-MCCH. The configuration information of the SC-MCCH includes a modification period of the SC-MCCH, a repetition period of the SC-MCCH, and information of radio frame and subframe scheduling the SC-MCCH. In addition, 1) A boundary of the modification period of the SC-MCCH satisfies: SFN mod m=0, where SFN represents a system frame number (that is, index) of the boundary, and m is the modification period of the SC-MCCH (namely, sc-mcch-ModificationPeriod) configured via SIB20. 2) The radio frame scheduling the SC-MCCH satisfies: SFN mod mcch-RepetitionPeriod=mcch-Offset, where SFN represents a system frame number of the radio frame, mcch-RepetitionPeriod represents the repetition period of the SC-MCCH, and mcch-Offset represents an offset for the SC-MCCH. (3) The subframe scheduling the SC-MCCH is indicated by sc-mcch-Subframe.

The SC-MCCH is scheduled via a physical downlink control channel (PDCCH). On one hand, a new radio network temporary identity (RNTI), that is, a single cell RNTI (SC-RNTI), is introduced to identify a PDCCH scheduling the SC-MCCH (for example, an SC-MCCH PDCCH), and optionally, the SC-RNTI has a fixed value of "FFFC". On the other hand, a new RNTI, i.e. a single cell notification RNTI (SC-N-RNTI), is introduced to identify a PDCCH indicating a change notification of the SC-MCCH (e.g. a notification PDCCH), and optionally, the SC-N-RNTI has a fixed value of "FFFB". In addition, the change notification may be indicated by one of eight bits in downlink control information (DCI) 1C. In LTE, SC-PTM configuration information is carried in the SC-MCCH configured via SIB20, and then the SC-MTCH is configured via the SC-MCCH, where the SC-MTCH is used for transmitting service data.

Specifically, the SC-MCCH transmits only one message (namely, SCPTMConfiguration), and the message is used for configuring the SC-PTM configuration information. The SC-PTM configuration information includes a temporary mobile group identity (TMGI), a session identity (session id), a group RNTI (G-RNTI), discontinuous reception (DRX) configuration information, and SC-PTM service information of a neighbour cell, etc. It should be noted that, SC-PTM in R13 does not support a robust header compression (ROHC) function.

SC-PTM DL DRX is controlled via the following parameters: onDurationTimerSCPTM, drx-InactivityTimerSCPTM, SC-MTCH-SchedulingCycle, and SC-MTCH-SchedulingOffset.

When "[(SFN*10)+subframe number] modulo(SC-MTCH-SchedulingCycle)=SC-MTCH-SchedulingOffset" is satisfied, onDurationTimerSCPTM will be started.

When DL PDCCH scheduling is received, drx-InactivityTimerSCPTM will be started.

A DL SC-PTM service will be received only when onDurationTimerSCPTM or drx-InactivityTimerSCP TM is running.

SC-PTM service continuity adopts the concept of SIB15-based MBMS service continuity, that is, an "SIB15+MBMSInterestIndication" mode. Service continuity of a terminal device in an idle state is based on the concept of frequency priority.

It should be noted that, although the foregoing schemes are described by taking an MBMS service as an example, the technical solutions of implementations of the disclosure are not limited thereto. In implementations of the disclosure, a multicast broadcast service (MBS) service is taken as an example for illustration, and the "MBS service" may also be replaced with "multicast service", "groupcast service", or "MBMS service".

In the NR system, it is necessary to meet multicast service requirements and broadcast service requirements in many scenarios, for example, Internet of vehicles, industrial Internet, etc. Therefore, it is necessary to introduce a multicast MBS service and a broadcast MBS service in NR. It should be noted that, the multicast MBS service refers to an MBS service transmitted in a multicast mode, and the broadcast MBS service refers to an MBS service transmitted in a broadcast mode.

In the NR system, for the multicast MBS service, the MBS service is transmitted to all terminal devices in a group. The terminal device receives the multicast MBS service in an RRC connected state, and the terminal device may receive multicast MBS service data in a PTM mode or a point to point (PTP) mode. For MBS service data in the PTM mode, corresponding scheduling information is scrambled by a G-RNTI configured by the network side, and for MBS service data in the PTP mode, corresponding scheduling information is scrambled by a cell RNTI (C-RNTI).

The multicast MBS service has relatively high requirements on reliability. How to ensure high reliability of the MBS service needs to be clarified. To this end, the following technical solutions of implementations of the disclosure are provided.

In technical solution of implementations of the disclosure, a transmission mode of an MBS service is proposed, that is, new transmission is transmitted in a PTM mode, and retransmission is transmitted in a PTP mode, in other words, PTP transmission can be a retransmission of PTM transmission. How to support such transmission mode so that a terminal device can correctly perform soft combining on new transmission and retransmission to reach a maximum receiving gain needs to be clarified.

It should be noted that, in implementations of the disclosure, the "new transmission" may also be replaced with "initial transmission", and the "retransmission" may also be replaced with "re-transmission".

Figure 2:
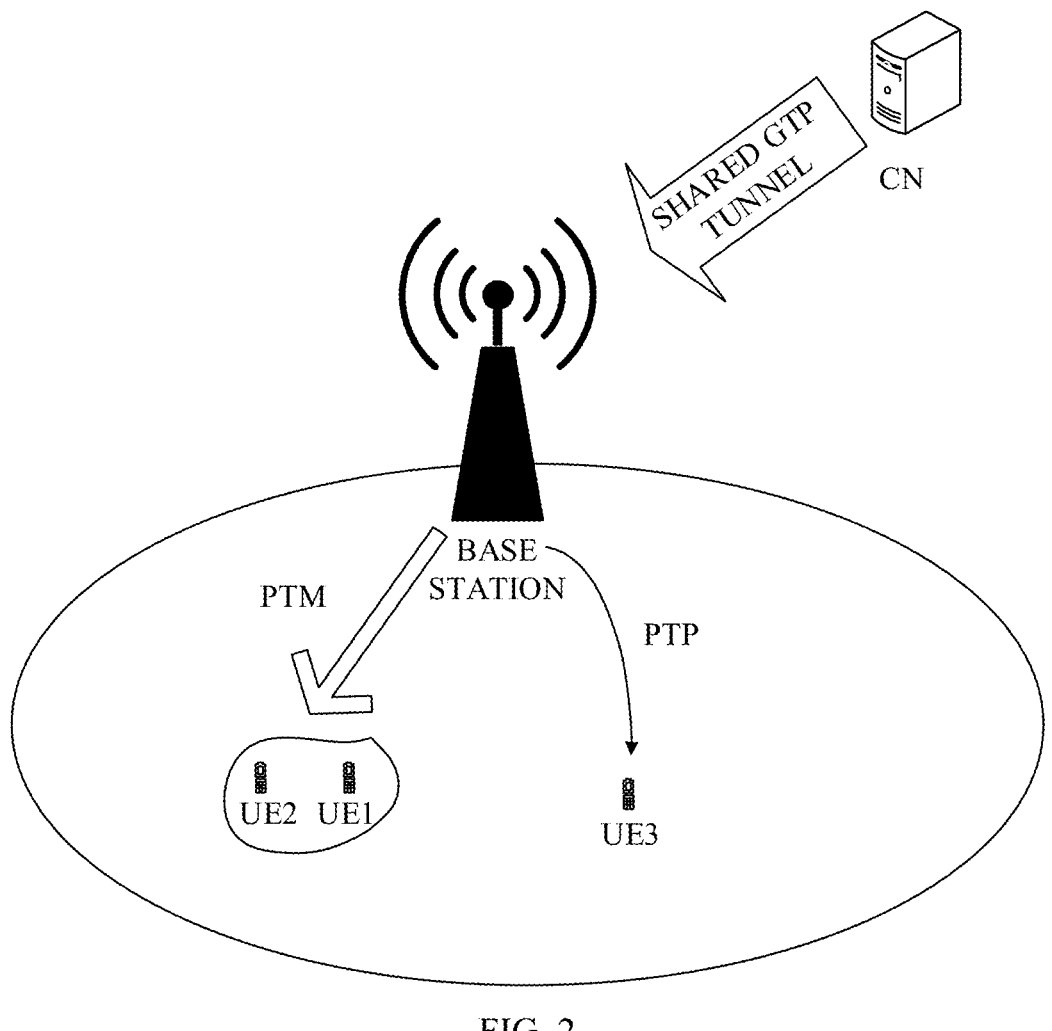
FIG. 2 is a schematic diagram illustrating transmission of a multicast broadcast service (MBS) service in a point to multipoint (PTM) mode and a point to point (PTP) mode provided in implementations of the disclosure.

In implementations of the disclosure, an MBS service is transmitted in a multicast mode, in other words, the MBS service is a multicast MBS service. Specifically, after receiving an MBS service delivered by a CN over a shared tunnel, a base station may deliver the MBS service to all terminal devices in a group through an air interface. Here, the base station may deliver the MSB service to all the terminal devices in the group in a PTP mode and/or a PTM mode. For example, the group has terminal device 1, terminal device 2, and terminal device 3. The base station may deliver the MBS service to terminal device 1 in the PTP mode, deliver the MBS service to terminal device 2 in the PTP mode, and deliver the MBS service to terminal device 3 in the PTP mode. Alternatively, the base station may deliver the MBS service to terminal device 1 in the PTP mode, and deliver the MBS service to terminal device 2 and terminal device 3 in the PTM mode. Alternatively, the base station may deliver the MBS service to terminal device 1, terminal device 2, and terminal device 3 in the PTM mode. Referring to FIG. 2, a CN and a base station may use a shared general packet radio services (GPRS) tunneling protocol (GTP) tunnel to transmit an MBS service, that is, the GTP tunnel is shared by both an MBS service in a PTM mode and an MBS service in the PTP mode. The base station delivers MBS service data to UE 1 and UE 2 in the PTM mode, and delivers the MBS service data to UE 3 in the PTP mode.

Figure 3:
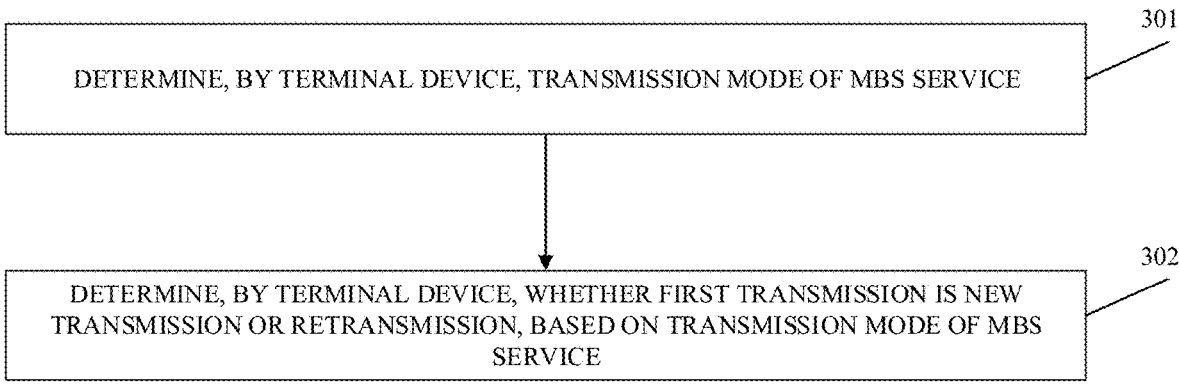
FIG. 3 is schematic flowchart I of a method for improving reliability of MBS service provided in implementations of the disclosure.

FIG. 3 is schematic flowchart I of a method for improving reliability of MBS service provided in implementations of the disclosure. As illustrated in FIG. 3, the method includes the following.

Step 301, a terminal device determines a transmission mode of an MBS service.

In implementations of the disclosure, the transmission mode of the MBS service is: new transmission is transmitted in a PTM mode, and retransmission is transmitted in a PTP mode. In other words, the transmission mode of the MBS service is: PTP transmission is used for retransmission of PTM transmission.

Here, scheduling information of transmission in the PTM mode is scrambled by a G-RNTI, and scheduling information of transmission in the PTP mode is scrambled by a C-RNTI.

In implementations of the disclosure, the terminal device may determine the transmission mode of the MBS service as follows. The terminal device receives configuration information of the MBS service sent by a network device, and determines the transmission mode of the MBS service according to the configuration information of the MBS service, where the configuration information of the MBS service includes first information, and the first information indicates that the transmission mode of the MBS service is: new transmission is transmitted in the PTM mode, and retransmission is transmitted in the PTP mode.

In some optional implementations of the disclosure, the configuration information of the MBS service is configured via dedicated RRC signaling.

In some optional implementations, the configuration information of the MBS service includes at least one of an ID of the MBS service or channel configuration information of the MBS service. In this way, the terminal device can receive MBS service data based on the configuration information of the MBS service.

In some optional implementations of the disclosure, the ID of the MBS service in the configuration information of the MBS service is used by the terminal device to determine which MBS service is to be received. In some examples, the ID of the MBS service may be a TMGI, a G-RNTI, etc.

In some optional implementations of the disclosure, the channel configuration information of the MBS service in the configuration information of the MBS service is used by the terminal device to determine information of a channel used for receiving the MB S service. In some examples, the channel configuration information of the MBS service may include at least one of configuration information of a control channel for the MBS service (e.g., configuration information of an MCCH) or configuration information of a service channel (also referred to as a data channel or a transport channel) for the MBS service (e.g., configuration information of an MTCH).

In some optional implementations of the disclosure, the configuration information of the MBS service further includes second information, where the second information indicates that a protocol stack architecture for the MB S service is a first protocol stack architecture or a second protocol stack architecture. In this way, the terminal device can determine the protocol stack architecture for the MBS service according to the configuration information of the MBS service.

In some optional implementations of the disclosure, if no protocol stack architecture for the MBS service is configured by a network side, the terminal device determines, according to predefined information, that the protocol stack architecture for the MBS service is a default protocol stack architecture, where the default protocol stack architecture is a first protocol stack architecture or a second protocol stack architecture.

The first protocol stack architecture and the second protocol stack architecture in the foregoing schemes will be described below. It should be noted that, the following protocol stack architectures are merely illustrative, and any protocol stack architecture supporting the PTM mode and the PTP mode can be used in implementations of the disclosure.

First Protocol Stack Architecture

In the first protocol stack architecture, the PTM mode and the PTP mode correspond to separate physical (PHY) entities, and the PTM mode and the PTP mode correspond to a shared packet data convergence protocol (PDCP) entity, a shared radio link control (RLC) entity, and a shared media access control (MAC) entity.

In addition, optionally, the PTM mode and the PTP mode correspond to a shared service data adaptation protocol (SDAP) entity.

Figure 4:
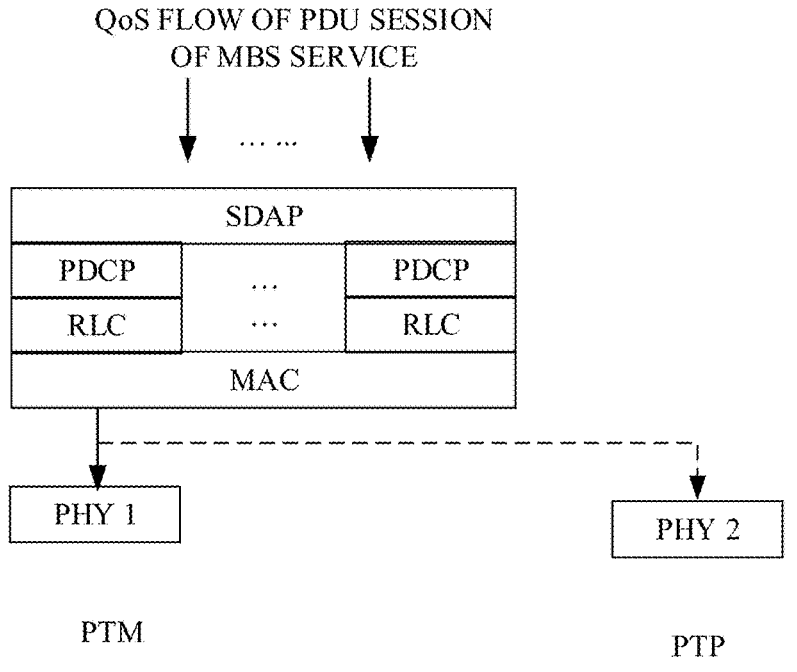
FIG. 4 is a schematic diagram illustrating a first protocol stack architecture provided in implementations of the disclosure.

In an example, referring to FIG. 4, FIG. 4 is a schematic diagram illustrating the first protocol stack architecture. The term "entity" is omitted in FIG. 4, for example, the "PHY" in FIG. 4 represents the "PHY entity". A protocol data unit (PDU) session of an MB S service carries one or more QoS flows, and the one or more QoS flows of the PDU session may be mapped onto one or more data radio bearers (DRBs) by an SDAP entity, where a mapping between the QoS flows and the DRBs may be one-to-one or multiple-to-one. Each DRB corresponds to one logical channel, and different DRBs are transmitted by different PDCP entities and different RLC entities, that is, different logical channels correspond to different PDCP entities and different RLC entities.

It should be noted that, in FIG. 4, for each DRB, there may be no SDAP entity, that is, for each DRB, there may be a PDCP entity or there may be PDCP entity+SDAP entity. A MAC entity transmits a MAC PDU (namely, one transport block (TB) of data) to PHY 1 entity, and then PHY 1 entity transmits the MAC PDU in the PTM mode. Alternatively, the MAC entity transmits the MAC PDU to PHY 2 entity, and then PHY 2 entity transmits the MAC PDU in the PTP mode.

Second Protocol Stack Architecture

In the second protocol stack architecture, the PTM mode and the PTP mode correspond to separate PHY entities and separate RLC entities, and the PTM mode and the PTP mode correspond to a shared PDCP entity and a shared MAC entity.

In addition, optionally, the PTM mode and the PTP mode correspond to a shared SDAP entity.

Figure 5:
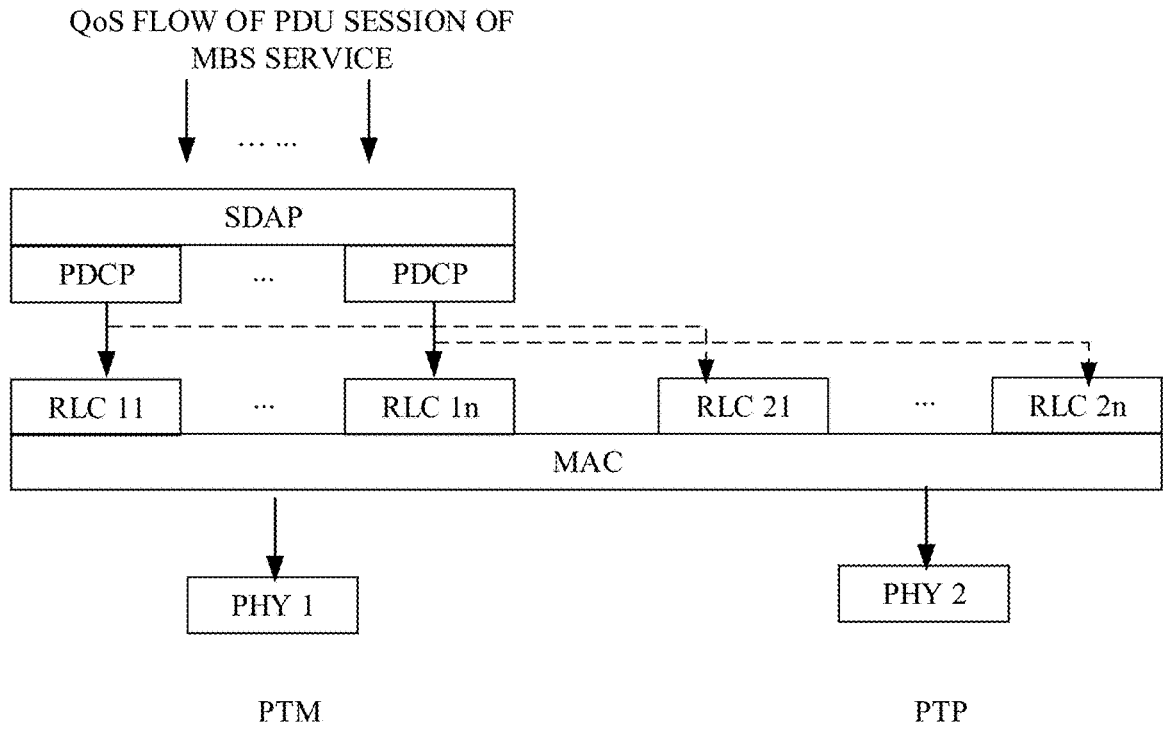
FIG. 5 is a schematic diagram illustrating a second protocol stack architecture provided in implementations of the disclosure.

Referring to FIG. 5, FIG. 5 is a schematic diagram illustrating the second protocol stack architecture. The term "entity" is omitted in FIG. 5, for example, the "PHY" in FIG. 5 represents the "PHY entity". A PDU session of an MBS service carries one or more QoS flows, and the one or more QoS flows of the PDU session may be mapped onto one or more DRBs by an SDAP entity, where a mapping between the QoS flows and the DRBs may be one-to-one or multiple-to-one. Each DRB corresponds to one logical channel, and different DRBs are transmitted by different PDCP entities and different RLC entities, that is, different logical channels correspond to different PDCP entities and different RLC entities.

It should be noted that, in FIG. 5, for each DRB, there may be no SDAP entity, that is, for each DRB, there may be a PDCP entity or there may be PDCP entity+SDAP entity. A PDCP entity transmits a PDCP PDU to RLC 1 entity, RLC 1 entity transmits a corresponding RLC PDU to a MAC entity, the MAC entity transmits a corresponding MAC PDU to PHY 1 entity, and then PHY 1 entity transmits the MAC PDU in the PTM mode. Alternatively, the PDCP entity transmits the PDCP PDU to RLC 2 entity, RLC 2 entity transmits a corresponding RLC PDU to the MAC entity, the MAC entity transmits a corresponding MAC PDU to PHY 2 entity, and then PHY 2 entity transmits the MAC PDU in the PTP mode.

It should be noted that, RLC 1 entity in FIG. 5 includes RLC 11 entity, RLC 12 entity, . . . , and RLC 1n entity, where different RLC entities correspond to different DRBs (that is, correspond to different logical channels). RLC 2 entity in FIG. 5 includes RLC 21 entity, RLC 22 entity, . . . , and RLC 2n entity, where different RLC entities correspond to different DRBs (that is, correspond to different logical channels).

Step 302, the terminal device determines, based on the transmission mode of the MBS service, whether a first transmission is new transmission or retransmission.

In implementations of the disclosure, the terminal device receives MBS service data based on a configuration for the MBS service. Specifically, the terminal device receives first DL scheduling information scrambled by a first RNTI, where the first DL scheduling information is used for scheduling the first transmission, and the first DL scheduling information carries a first new data indication (NDI). If the transmission mode of the MBS service is: new transmission is transmitted in the PTM mode, and retransmission is transmitted in the PTP mode, the terminal device determines, according to the first RNTI and/or the first NDI, whether the first transmission is new transmission or is retransmission. The following will elaborate some cases regarding how to determine the mode of the first transmission. It should be noted that, in implementations of the disclosure, the "DL scheduling information" may also be replaced with "DL grant".

Case 1: If the first RNTI is a G-RNTI, the terminal device determines that the first transmission is new transmission.

Specifically, the terminal device receives the first DL scheduling information scrambled by a G-RNTI, where the first DL scheduling information carries a first HARQ process ID and the first NDI. As an example, the first HARQ process ID may be expressed as HARQ process id=k, that is, the value of the first HARQ process ID is k. The terminal device receives the first transmission based on the first DL scheduling information. Here, reception of the first transmission may also be understood as reception of MBS service data carried in a PDSCH. Since the first DL scheduling information for scheduling the first transmission is scrambled by a G-RNTI, the first transmission scheduled by the first DL scheduling information is new transmission. Here, no matter whether DL scheduling information earlier than the first DL scheduling information is scrambled by a C-RNTI or is scrambled by a G-RNTI, the first transmission scheduled by the first DL scheduling information is determined as new transmission, that is, it is considered that NDI is toggled.

For example, the "DL scheduling information" may be equivalently replaced with "DL Grant", and accordingly, the "transmission scheduled by DL scheduling information" may be equivalently replaced with "TB scheduled by DL Grant".

In an example, the network side transmits DL Grant 1 scrambled by a G-RNTI and transmits TB 1 scheduled by DL Grant 1. The terminal device receives DL Grant 1 scrambled by a G-RNTI and receives TB 1 based on DL Grant 1, and decodes TB 1 successfully and then feeds back HARQ-acknowledgement (ACK) information. After receiving the HARQ-ACK information, the network side transmits DL Grant 2 scrambled by a G-RNTI and transmits TB 2 scheduled by DL Grant 2. The terminal device receives DL Grant 2 scrambled by a G-RNTI and receives TB 2 based on DL Grant 2, and determines TB 2 as new transmission.

In an example, the network side transmits DL Grant 1 scrambled by a G-RNTI and transmits TB 1 scheduled by DL Grant 1. The terminal device receives DL Grant 1 scrambled by a G-RNTI and receives TB 1 based on DL Grant 1, and fails to decode TB 1 and then feeds back HARQ-negative acknowledgement (NACK) information. After receiving the HARQ-NACK information, the network side switches to the PTP mode from the PTM mode, transmits DL Grant 2 scrambled by a C-RNTI and transmits TB 1 scheduled by DL Grant 2. The terminal device receives DL Grant 2 scrambled by a C-RNTI and receives retransmission of TB 1 based on DL Grant 2, and decodes TB 1 successfully and then feeds back HARQ-ACK information.

After receiving the HARQ-ACK information, the network side transmits DL Grant 3 scrambled by a G-RNTI and transmits TB 2 scheduled by DL Grant 3. The terminal device receives DL Grant 3 scrambled by a G-RNTI and receives TB 2 based on DL Grant 3, and determines TB 2 as new transmission.

In an example, the network side transmits DL Grant 1 scrambled by a G-RNTI and transmits TB 1 scheduled by DL Grant 1. The terminal device fails to receive DL Grant 1 and does not feed back any HARQ feedback information. The network side therefore does not receive any HARQ feedback information within a certain time period after transmitting DL Grant 1, then switches to the PTP mode from the PTM mode, and transmits DL Grant 2 scrambled by a C-RNTI and transmits TB 1 scheduled by DL Grant 2. The terminal device receives DL Grant 2 scrambled by a C-RNTI and receives retransmission of TB 1 based on DL Grant 2, and decodes TB 1 successfully and then feeds back HARQ-ACK information. After receiving the HARQ-ACK information, the network side transmits DL Grant 3 scrambled by a G-RNTI and transmits TB 2 scheduled by DL Grant 3. The terminal device receives DL Grant 3 scrambled by a G-RNTI and receives TB 2 based on DL Grant 3, and determines TB 2 as new transmission.

In an example, the network side transmits TB 1 based on unicast scheduling or semi-persistent scheduling (SPS), then transmits DL Grant 1 scrambled by a G-RNTI and transmits TB 1 scheduled by DL Grant 1. The terminal device receives DL Grant 1 scrambled by a G-RNTI and receives TB 1 based on DL Grant 1, and determines TB 1 as new transmission.

It should be noted that, for transmissions (including new transmission and retransmission) of the same TB (or the same MBS service data), corresponding HARQ process IDs are the same, and the HARQ process ID is carried in a DL Grant used for scheduling the TB.

It should be noted that, if a DL Grant is scrambled by a G-RNTI, a TB scheduled by the DL Grant is transmitted in the PTM mode; and if a DL Grant is scrambled by a C-RNTI, a TB scheduled by the DL Grant is transmitted in the PTP mode.

Case 2: If the first RNTI is a C-RNTI and the first NDI is different from a second NDI, the terminal device determines that the first transmission is new transmission, where the second NDI is carried in second DL scheduling information, the second DL scheduling information is DL scheduling information received by the terminal device before the first DL scheduling information, the second DL scheduling information is used for scheduling a second transmission, and the second transmission and the first transmission both correspond to a first HARQ process ID.

Here, the second DL scheduling information is scrambled by a G-RNTI, or the second DL scheduling information is scrambled by a C-RNTI.

Specifically, the terminal device receives the first DL scheduling information scrambled by a C-RNTI, where the first DL scheduling information carries the first HARQ process ID and the first NDI. As an example, the first HARQ process ID may be expressed as HARQ process id=k, that is, the value of the first HARQ process ID is k. The terminal device receives the first transmission based on the first DL scheduling information. Here, reception of the first transmission may also be understood as reception of MBS service data carried in a PDSCH. Since the first DL scheduling information for scheduling the first transmission is scrambled by a C-RNTI, it is necessary to compare the first NDI carried in the first DL scheduling information with the second NDI carried in the second DL scheduling information previously received. If the first NDI is different from the second NDI, no matter whether the second DL scheduling information is scrambled by a C-RNTI or is scrambled by a G-RNTI, the first transmission scheduled by first DL scheduling information is determined as new transmission, i.e. NDI is toggled. If the first NDI is the same as the second NDI, the first transmission scheduled by the first DL scheduling information is determined as retransmission, that is, NDI is not toggled.

For example, the "DL scheduling information" may be equivalently replaced with "DL Grant", and accordingly, the "transmission scheduled by DL scheduling information" may be equivalently replaced with "TB scheduled by DL Grant".

In an example, the network side transmits DL Grant 1 scrambled by a G-RNTI and transmits TB 1 scheduled by DL Grant 1. The terminal device receives DL Grant 1 scrambled by a G-RNTI and receives TB 1 based on DL Grant 1, and decodes TB 1 successfully and then feeds back HARQ-ACK information. After receiving the HARQ-ACK information, the network side transmits DL Grant 2 scrambled by a C-RNTI and transmits TB 2 scheduled by DL Grant 2. The terminal device receives DL Grant 2 scrambled by a C-RNTI and receives TB 2 based on DL Grant 2. Since an NDI carried in DL Grant 2 is different from an NDI carried in DL Grant 1, TB 2 is determined as new transmission.

In an example, the network side transmits DL Grant 1 scrambled by a G-RNTI and transmits TB 1 scheduled by DL Grant 1. The terminal device receives DL Grant 1 scrambled by a G-RNTI and receives TB 1 based on DL Grant 1, and fails to decode TB 1 and then feeds back HARQ-NACK information. After receiving the HARQ-NACK information, the network side switches to the PTP mode from the PTM mode, and transmits DL Grant 2 scrambled by a C-RNTI and transmits TB 1 scheduled by DL Grant 2. The terminal device receives DL Grant 2 scrambled by a C-RNTI and receives retransmission of TB 1 based on DL Grant 2, and decodes TB 1 successfully and then feeds back HARQ-ACK information. After receiving the HARQ-ACK information, the network side transmits DL Grant 3 scrambled by a C-RNTI and transmits TB 2 scheduled by DL Grant 3. The terminal device receives DL Grant 3 scrambled by a C-RNTI and receives TB 2 based on DL Grant 3. Since an NDI carried in DL Grant 3 is different from an NDI carried in DL Grant 2, TB 2 is determined as new transmission.

In an example, the network side transmits DL Grant 1 scrambled by a G-RNTI and transmits TB 1 scheduled by DL Grant 1. The terminal device fails to receive DL Grant 1 and does not feed back any HARQ feedback information. The network side therefore does not receive any HARQ feedback information within a certain time period after transmitting DL Grant 1, then switches to the PTP mode from the PTM mode, and transmits DL Grant 2 scrambled by a C-RNTI and transmits TB 1 scheduled by DL Grant 2. The terminal device receives DL Grant 2 scrambled by a C-RNTI and receives retransmission of TB 1 based on DL Grant 2, and decodes TB 1 successfully and then feeds back HARQ-ACK information. After receiving the HARQ-ACK information, the network side transmits DL Grant 3 scrambled by a C-RNTI and transmits TB 2 scheduled by DL Grant 3. The terminal device receives DL Grant 3 scrambled by a C-RNTI and receives TB 2 based on DL Grant 3. Since an NDI carried in DL Grant 3 is different from an NDI carried in DL Grant 2, TB 2 is determined as new transmission.

In an example, the network side transmits TB 1 based on unicast scheduling or SPS, then transmits DL Grant 1 scrambled by a C-RNTI and transmits TB 1 scheduled by DL Grant 1. The terminal device receives DL Grant 1 scrambled by a C-RNTI and receives TB 1 based on DL Grant 1, and determines TB 1 as new transmission.

Case 3: If the first RNTI is a C-RNTI and there is no second NDI associated with the first NDI, the terminal device determines that the first transmission is new transmission, where the second NDI being associated with the first NDI means that a HARQ process ID corresponding to the second NDI is the same as a HARQ process ID corresponding to the first NDI.

Specifically, the terminal device receives the first DL scheduling information scrambled by a C-RNTI, where the first DL scheduling information carries a first HARQ process ID and the first NDI. As an example, the first HARQ process ID may be expressed as HARQ process id=k, that is, the value of the first HARQ process ID is k. The terminal device receives the first transmission based on the first DL scheduling information. Here, reception of the first transmission may also be understood as reception of MBS service data carried in a PDSCH. Since the first DL scheduling information for scheduling the first transmission is scrambled by a C-RNTI, it is necessary to compare the first NDI carried in the first DL scheduling information with the second NDI carried in the second DL scheduling information previously received. However, the terminal device does not receive any DL scheduling information that is associated with the same HARQ process ID as the first DL scheduling information and there is no NDI that can be compared with the first NDI, and therefore, the first transmission scheduled by the first DL scheduling information is determined as new transmission.

In some optional implementations, technical solutions of implementations of the disclosure further include the following. If the first transmission is new transmission, the terminal device will decode the first transmission to obtain a decoding result. If the decoding result indicates that the decoding succeeds, the terminal device will feed back HARQ ACK information. If the decoding result indicates that the decoding fails, the terminal device will feed back HARQ NACK information and store data corresponding to the first transmission in a buffer.

Here, the decoding is implemented at a PHY layer of the terminal device, and the terminal device feeds back the HARQ NACK information or the HARQ ACK information to the network side according to the decoding result of the PHY layer. In addition, if the terminal device feeds back the HARQ NACK information, the terminal device stores received data soft bits in a HARQ buffer.

At the network side, after a base station transmits a TB in the PTM mode, if the base station receives HARQ NACK information regarding the TB fed back by some terminal device or does not receive any HARQ feedback information regarding the TB fed back by some terminal device, the base station will switch the terminal device to the PTP mode and retransmit the TB to the terminal device in the PTP mode. In retransmission scheduling in the PTP mode, scheduling information of the TB is scrambled by a C-RNTI. In addition, a HARQ process ID carried in the scheduling information of the TB is the same as a HARQ process ID carried in scheduling information corresponding to the previous PTM mode. Furthermore, an NDI value carried in the scheduling information of the TB is also the same as an NDI value carried in the scheduling information corresponding to the previous PTM mode.

At a terminal-device side, if the terminal device does not feed back the HARQ ACK information, the terminal device will receive third DL scheduling information scrambled by a C-RNTI, where the third DL scheduling information is used for scheduling a third transmission, and the third transmission and the first transmission both correspond to the first HARQ process ID. The terminal device performs soft combining on data corresponding to the third transmission and the data corresponding to the first transmission in the buffer, and decodes the data to obtain a decoding result. If the decoding result indicates that the decoding succeeds, the terminal device will feed back HARQ ACK information. If the decoding result indicates that the decoding fails, the terminal device will feed back HARQ NACK information and store the data corresponding to the third transmission in the buffer.

For example, the terminal device receives the third DL scheduling information scrambled by a C-RNTI, where the first HARQ process ID is indicated in the third DL scheduling information. If there is cached data regarding a HARQ process corresponding to the first HARQ process ID, the terminal device performs soft combining on data scheduled by the third DL scheduling information received and the cached data and then decodes the data, and then determines, based on the decoding result, whether to feed back the HARQ ACK information or to feed back the HARQ NACK information.

At the network side, for a TB, HARQ feedback corresponding to the PTM mode and HARQ feedback corresponding to the PTP mode are taken into consideration. If HARQ feedback regarding the TB of all terminal devices in an MBS group is HARQ ACK information, the base station performs new transmission of a next TB corresponding to a HARQ process ID of the TB.

In implementations of the disclosure, if the decoding result of the foregoing scheme indicates that the decoding succeeds, the terminal device obtains a first TB. It can be understood that, the first TB corresponds to the first HARQ process ID. The terminal device obtains, from the first TB, a first MAC service data unit (SDU) and a first logical channel ID (LCID) corresponding to the MAC SDU. The terminal device determines, according to the first LCID and the first HARQ process ID, an RLC entity to which the first MAC SDU is to be submitted.

Case 1

In one case, the first HARQ process ID belongs to a first HARQ process ID set, and the first LCID belongs to a first LCID set. The first HARQ process ID set and a second HARQ process ID set do not overlap, and the first LCID set and a second LCID set at least partially overlap, where the first HARQ process ID set and the first LCID set are used for an MBS service, and the second HARQ process ID set and the second LCID set are used for a unicast service. Here, the unicast service is, for example, an eMBB unicast service.

In this case, a HARQ process ID set for an MBS service and a HARQ process ID set for a unicast service do not overlap. The network side can configure for the terminal device a HARQ process ID set dedicated for an MBS service via dedicated signaling.

As an example, HARQ process IDs in a HARQ process ID set range from 0 to N, where N is a positive integer. HARQ process IDs ranging from 0 to k can be reserved for an MBS service, where k is a positive integer and $0 \leq k \leq N$, and other HARQ process IDs are used for a unicast service.

Based on that the first HARQ process ID belongs to the first HARQ process ID set, the terminal device determines that the first HARQ process ID is used for an MBS service.

The terminal device determines, from RLC entities corresponding to an MBS service, an RLC entity corresponding to the first LCID as an RLC entity to which the first MAC SDU is to be submitted.

For example, there are four RLC entities in total. RLC entity 1 and RLC entity 2 are RLC entities corresponding to an MBS service, and RLC entity 3 and RLC entity 4 are RLC entities corresponding to a unicast service. RLC entity 1 corresponds to LCID 1, RLC entity 2 corresponds to LCID 2, RLC entity 3 corresponds to LCID 1, and RLC entity 4 corresponds to LCID 2. The terminal device decodes to obtain a TB, and obtains a MAC SDU and corresponding LCID 1 from the TB. The terminal device determines, according to a HARQ process ID corresponding to the TB, that the TB is a TB for an MBS service. The terminal device determines, from RLC entity 1 and RLC entity 2, that LCID 1 corresponds to RLC entity 1, and then submits the MAC SDU to RLC entity 1.

Case 2

In one case, the first HARQ process ID belongs to a first HARQ process ID set, and the first LCID belongs to a first LCID set. The first HARQ process ID set and a second HARQ process ID set at least partially overlap, and the first LCID set and a second LCID set do not overlap, where the first HARQ process ID set and the first LCID set are used for an MBS service, and the second HARQ process ID set and the second LCID set are used for a unicast service.

In this case, a HARQ process ID set for an MBS service and a HARQ process ID set for a unicast service at least partially overlap, for example, completely overlap. However, an LCID set for an MBS service and an LCID set for a unicast service do not overlap. The network side can configure for the terminal device an LCID set dedicated for an MBS service via dedicated signaling.

The terminal device determines, from RLC entities corresponding to an MBS service and RLC entities corresponding to a unicast service, an RLC entity corresponding to the first LCID as an RLC entity to which the first MAC SDU is to be submitted.

For example, there are four RLC entities in total. RLC entity 1 and RLC entity 2 are RLC entities corresponding to an MBS service, and RLC entity 3 and RLC entity 4 are RLC entities corresponding to a unicast service. RLC entity 1 corresponds to LCID 1, RLC entity 2 corresponds to LCID 2, RLC entity 3 corresponds to LCID 3, and RLC entity 4 corresponds to LCID 4. The terminal device decodes to obtain a TB, and obtains a MAC SDU and corresponding LCID 1 from the TB. According to a HARQ process ID corresponding to the TB, the terminal device cannot determine which MBS service the TB corresponds to. Instead, based on LCID 1, the terminal device can directly determine that LCID 1 corresponds to RLC entity 1 among all the RLC entities, and then submit the MAC SDU to RLC entity 1.

Figure 6:
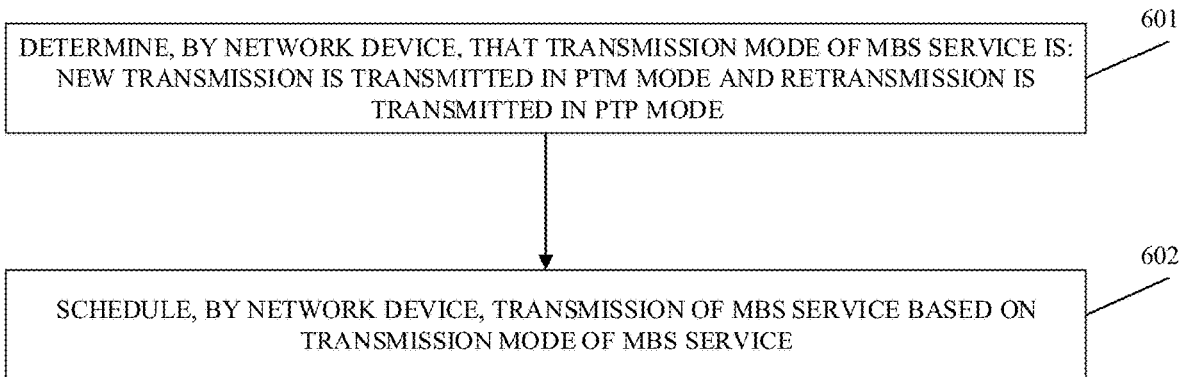
FIG. 6 is schematic flowchart II of a method for improving reliability of MBS service provided in implementations of the disclosure.

FIG. 6 is schematic flowchart II of a method for improving reliability of MBS service provided in implementations of the disclosure. As illustrated in FIG. 6, the method includes the following.

Step 601, a network device determines that a transmission mode of an MBS service is: new transmission is transmitted in a PTM mode, and retransmission is transmitted in a PTP mode.

Step 602, the network device schedules transmission of the MBS service based on the transmission mode of the MBS service.

In implementations of the disclosure, the network device schedules new transmission of first service data in the PTM mode, and/or schedules retransmission of the first service data in the PTP mode, where the first service data is service data of the MBS service.

In some optional implementations, the network device sends first DL scheduling information scrambled by a G-RNTI, where the first DL scheduling information is used for scheduling new transmission of the first service data, and the first DL scheduling information carries a first HARQ process ID.

In some optional implementations, the network device sends third DL scheduling information scrambled by a C-RNTI, where the third DL scheduling information is used for scheduling retransmission of the first service data, and the third DL scheduling information carries the first HARQ process ID. In addition, an NDI carried in the third DL scheduling information is the same as an NDI carried in the first DL scheduling information.

In implementations of the disclosure, for an MBS service, multiple terminal devices receiving the MBS service are referred to as an MBS group. In the MBS group, some terminal devices require retransmission, while some terminal devices do not require retransmission. For the terminal devices that require retransmission, transmission is performed in the PTP mode. Specifically, the network device schedules retransmission of the first service data in the PTP mode to each of at least one terminal device, where the at least one terminal device is at least one terminal device in an MBS group.

Here, the at least one terminal device includes at least one terminal device that feeds back HARQ NACK information regarding the first service data, and/or at least one terminal device that does not feed back HARQ feedback information regarding the first service data.

As an example, an MBS group has four terminal devices, namely UE 1, UE 2, UE 3, and UE 4. A base station transmits TB 1 to the MBS group in the PTM mode. The base station receives HARQ ACK information regarding TB 1 fed back by UE 1 and UE 4 and receives HARQ NACK information regarding TB 1 fed back by UE 2, but does not receive any HARQ feedback information regarding TB 1 fed back by UE 3. The base station schedules retransmission of TB 1 to each of UE 2 and UE 3 in the PTP mode. Specifically, the base station sends scheduling information scrambled by a C-RNTI to each of UE 2 and UE 3, where the scheduling information is used for scheduling retransmission of TB 1.

In implementations of the disclosure, if HARQ ACK information regarding the first service data fed back by all terminal devices in the MBS group is received by the network device, the network device will schedule new transmission of second service data in the PTM mode, where the second service data is data to be transmitted next to the first service data.

As an example, an MBS group has four terminal devices, namely UE 1, UE 2, UE 3, and UE 4. The base station transmits TB 1 to the MBS group in the PTM mode. The base station receives HARQ ACK information regarding TB 1 fed back by UE 1 and UE 4 and receives HARQ NACK information regarding TB 1 fed back by UE 2, but does not receive any HARQ feedback information regarding TB 1 fed back by UE 3. The base station schedules retransmission of TB 1 to each of UE 2 and UE 3 in the PTP mode. Then the base station receives HARQ ACK information regarding TB 1 fed back by UE 2 and UE 3. At this time, HARQ ACK information regarding TB 1 fed back by all the UEs in the TBS group is received by the base station, and then the base station performs new transmission of the next TB 2. Here, a HARQ for TB 2 may be identified according to a HARQ for previous TB 1, and new transmission of TB 2 may be performed in the PTM mode.

It should be noted that, the technical solution in FIG. 6 may be implemented in combination with the technical solution in FIG. 3.

With the above technical solutions, it is clarified that the transmission mode of the MBS service is: new transmission is transmitted in the PTM mode, and retransmission is transmitted in the PTP mode. The network device schedules transmission of the MBS service based on the transmission mode of the MBS service. The terminal device determines, based on the transmission mode of the MBS service, whether the first transmission is new transmission or is retransmission. As such, it is possible to ensure reliability in reception of the MBS service to the greatest extent.

Figure 7:
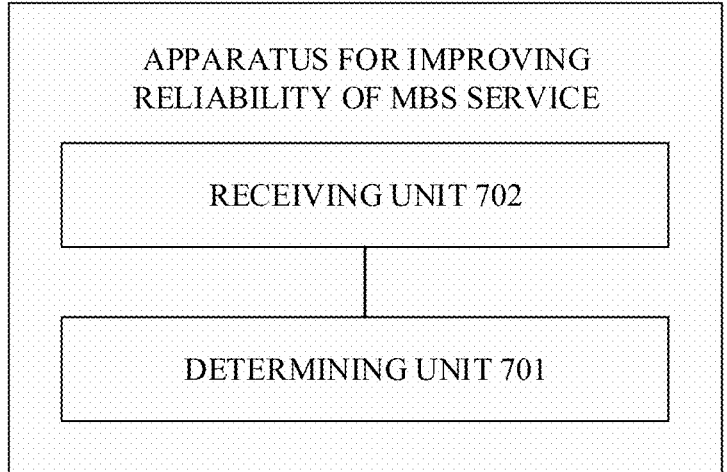
FIG. 7 is schematic structural diagram I of an apparatus for improving reliability of MBS service provided in implementations of the disclosure.

FIG. 7 is schematic structural diagram I of an apparatus for improving reliability of MBS service provided in implementations of the disclosure. The apparatus is applicable to a terminal device. As illustrated in FIG. 7, the apparatus includes a determining unit 701. The determining unit 701 is configured to determine a transmission mode of an MBS service, and determine, based on the transmission mode of the MBS service, whether a first transmission is new transmission or is retransmission.

In some optional implementations, the apparatus further includes a receiving unit 702. The receiving unit 702 is configured to receive configuration information of the MBS service sent by a network device. The determining unit 701 is configured to determine the transmission mode of the MBS service according to the configuration information of the MBS service, where the configuration information of the MBS service includes first information, and the first information indicates that the transmission mode of the MBS service is: new transmission is transmitted in a PTM mode, and retransmission is transmitted in a PTP mode.

In some optional implementations, the determining unit 701 is further configured to determine a protocol stack architecture for the MB S service according to the configuration information of the MBS service, where the configuration information of the MBS service further includes second information, and the second information indicates that the protocol stack architecture for the MBS service is a first protocol stack architecture or a second protocol stack architecture.

In some optional implementations, the determining unit 701 is further configured to determine, according to predefined information, that the protocol stack architecture for the MB S service is a default protocol stack architecture, where the default protocol stack architecture is a first protocol stack architecture or a second protocol stack architecture.

In some optional implementations, in the first protocol stack architecture, the PTM mode and the PTP mode correspond to separate PHY entities, and the PTM mode and the PTP mode correspond to a shared PDCP entity, a shared RLC entity, and a shared MAC entity.

In some optional implementations, in the second protocol stack architecture, the PTM mode and the PTP mode correspond to separate PHY entities and separate RLC entities, and the PTM mode and the PTP mode correspond to a shared PDCP entity and a shared MAC entity.

In some optional implementations, the apparatus further includes a receiving unit 702. The receiving unit 702 is configured to receive first DL scheduling information scrambled by a first radio RNTI, where the first DL scheduling information is used for scheduling the first transmission, and the first DL scheduling information carries a first NDI. The determining unit 701 is configured to determine, according to the first RNTI and/or the first NDI, whether the first transmission is new transmission or is retransmission, if the transmission mode of the MBS service is: new transmission is transmitted in the PTM mode, and retransmission is transmitted in the PTP mode.

In some optional implementations, the determining unit 701 is configured to determine that the first transmission is new transmission, if the first RNTI is a G-RNTI.

In some optional implementations, the determining unit 701 is configured to determine that the first transmission is new transmission, if the first RNTI is a C-RNTI and the first NDI is different from a second NDI, where the second NDI is carried in second DL scheduling information, the second DL scheduling information is DL scheduling information received by the terminal device before the first DL scheduling information, the second DL scheduling information is used for scheduling a second transmission, and the second transmission and the first transmission both correspond to a first HARQ process ID.

In some optional implementations, the second DL scheduling information is scrambled by a G-RNTI, or the second DL scheduling information is scrambled by a C-RNTI.

In some optional implementations, the determining unit 701 is configured to determine that the first transmission is new transmission, if the first RNTI is a C-RNTI and there is no second NDI associated with the first NDI, where the second NDI being associated with the first NDI means that a HARQ process ID corresponding to the second NDI is the same as a HARQ process ID corresponding to the first NDI.

In some optional implementations, the apparatus further includes a decoding unit, a feedback unit, and a storage unit. The decoding unit is configured to decode the first transmission to obtain a decoding result, if the first transmission is new transmission. The feedback unit is configured to feed back HARQ ACK information if the decoding result indicates that the decoding succeeds, and feed back HARQ NACK information if the decoding result indicates that the decoding fails. The storage unit is configured to store data corresponding to the first transmission in a buffer if the decoding result indicates that the decoding fails.

In some optional implementations, the receiving unit 702 is further configured to receive third DL scheduling information scrambled by a C-RNTI, where the third DL scheduling information is used for scheduling a third transmission, and the third transmission and the first transmission both correspond to the first HARQ process ID. The decoding unit is further configured to perform soft combining on data corresponding to the third transmission and the data corresponding to the first transmission in the buffer, and decode the data to obtain a decoding result. The feedback unit is further configured to feed HARQ ACK information if the decoding result indicates that the decoding succeeds, and feed back HARQ NACK information if the decoding result indicates that the decoding fails. The storage unit is further configured to store the data corresponding to the third transmission in the buffer if the decoding result indicates that the decoding fails.

In some optional implementations, if the decoding result indicates that the decoding succeeds, the decoding unit obtains a first TB, and the first TB corresponds to the first HARQ process ID. The decoding unit is further configured to obtain, from the first TB, a first MAC SDU and a first LCID corresponding to the MAC SDU. The determining unit 701 is further configured to determine, according to the first LCID and the first HARQ process ID, an RLC entity to which the first MAC SDU is to be submitted.

In some optional implementations, the first HARQ process ID belongs to a first HARQ process ID set, and the first LCID belongs to a first LCID set. The first HARQ process ID set and a second HARQ process ID set do not overlap, and the first LCID set and a second LCID set at least partially overlap. The first HARQ process ID set and the first LCID set are used for an MBS service, and the second HARQ process ID set and the second LCID set are used for a unicast service.

In some optional implementations, the determining unit 701 is configured to determine that the first HARQ process ID is used for an MBS service, based on that the first HARQ process ID belongs to the first HARQ process ID set, and determine, from RLC entities corresponding to an MBS service, an RLC entity corresponding to the first LCID as an RLC entity to which the first MAC SDU is to be submitted.

In some optional implementations, the first HARQ process ID belongs to a first HARQ process ID set, and the first LCID belongs to a first LCID set. The first HARQ process ID set and a second HARQ process ID set at least partially overlap, and the first LCID set and a second LCID set do not overlap. The first HARQ process ID set and the first LCID set are used for an MBS service, and the second HARQ process ID set and the second LCID set are used for a unicast service.

In some optional implementations, the determining unit 701 is configured to determine, from RLC entities corresponding to an MBS service and RLC entities corresponding to a unicast service, an RLC entity corresponding to the first LCD as an RLC entity to which the first MAC SDU is to be submitted.

It should be understood by those skilled in the art that for elaborations of the above apparatus in implementations of the disclosure, reference can be made to the elaborations of the method in implementations of the disclosure for understanding.

Figure 8:
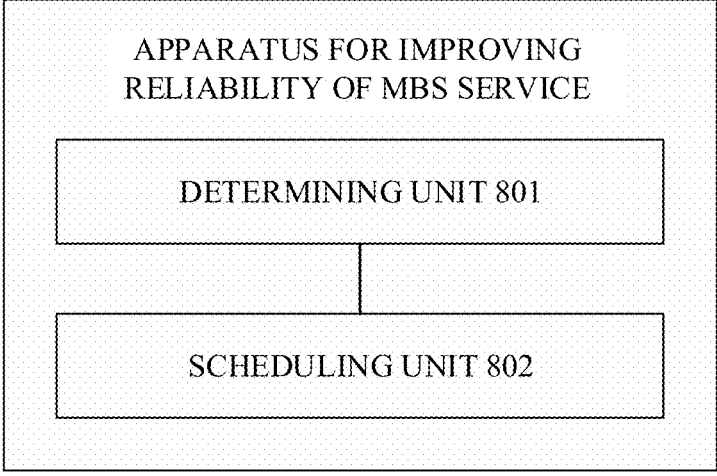
FIG. 8 is schematic structural diagram II of an apparatus for improving reliability of MBS service provided in implementations of the disclosure.

FIG. 8 is schematic structural diagram II of an apparatus for improving reliability of MBS service provided in implementations of the disclosure. The apparatus is applicable to a network device. As illustrated in FIG. 8, the apparatus includes a determining unit 801 and a scheduling unit 802. The determining unit 801 is configured to determine that a transmission mode of an MBS service is: new transmission is transmitted in a PTM mode, and retransmission is transmitted in a PTP mode. The scheduling unit 802 is configured to schedule transmission of the MBS service based on the transmission mode of the MBS service.

In some optional implementations, the scheduling unit 802 is configured to schedule new transmission of first service data in the PTM mode, and/or schedule retransmission of the first service data in the PTP mode, where the first service data is service data of the MBS service.

In some optional implementations, the scheduling unit 802 is configured to send first DL scheduling information scrambled by a G-RNTI, where the first DL scheduling information is used for scheduling new transmission of the first service data, and the first DL scheduling information carries a first HARQ process ID.

In some optional implementations, the scheduling unit 802 is configured to send third DL scheduling information scrambled by a C-RNTI, where the third DL scheduling information is used for scheduling retransmission of the first service data, and the third DL scheduling information carries the first HARQ process ID.

In some optional implementations, an NDI carried in the third DL scheduling information is the same as an NDI carried in the first DL scheduling information.

In some optional implementations, the scheduling unit 802 is configured to schedule retransmission of the first service data in the PTP mode to each of at least one terminal device, where the at least one terminal device is at least one terminal device in an MBS group.

In some optional implementations, the at least one terminal device includes at least one terminal device that feeds back HARQ NACK information regarding the first service data, and/or at least one terminal device that does not feed back HARQ feedback information regarding the first service data.

In some optional implementations, the scheduling unit 802 is further configured to schedule new transmission of second service data in the PTM mode if HARQ ACK information regarding the first service data fed back by all terminal devices in the MBS group is received, where the second service data is data to be transmitted next to the first service data.

It should be understood by those skilled in the art that for elaborations of the above apparatus in implementations of the disclosure, reference can be made to the elaborations of the method in implementations of the disclosure for understanding.

Figure 9:
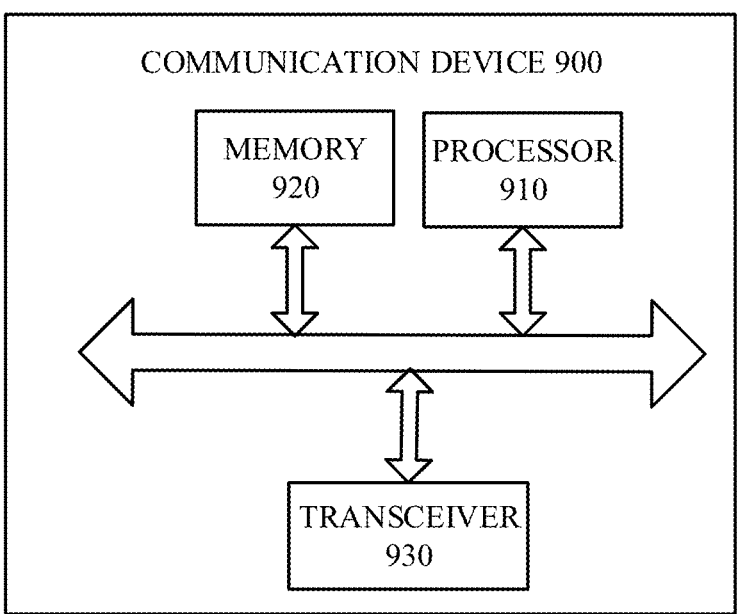
FIG. 9 is a schematic structural diagram of a communication device provided in implementations of the disclosure.

FIG. 9 is a schematic structural diagram of a communication device 900 provided in implementations of the disclosure. The communication device may be a terminal device or may be a network device. The communication device 900 illustrated in FIG. 9 includes a processor 910 and a transceiver. The processor 910 can invoke and execute computer programs stored in a memory, to perform the method in implementations of the disclosure.

Optionally, as illustrated in FIG. 9, the communication device 900 may further include the memory 920. The processor 910 can invoke and execute the computer programs stored in the memory 920, to perform the method in implementations of the disclosure.

The memory 920 may be a separate device independent of the processor 910, or may be integrated into the processor 910.

Optionally, as illustrated in FIG. 9, the communication device 900 can further include a transceiver 930. The processor 910 can control the transceiver 930 to communicate with other devices, specifically, to transmit information or data to other devices or to receive information or data transmitted by other devices.

The transceiver 930 may include a transmitter and a receiver. The transceiver 930 may further include an antenna, where one or more antennas can be provided.

Optionally, the communication device 900 may be operable as the network device in implementations of the disclosure, and the communication device 900 can implement the operations performed by the network device in various methods in implementations of the disclosure, which will not be repeated herein for the sake of simplicity.

Optionally, the communication device 900 may be operable as the mobile terminal/the terminal device in implementations of the disclosure, and the communication device 900 can implement the operations performed by the mobile terminal/the terminal device in various methods in implementations of the disclosure, which will not be repeated herein for the sake of simplicity.

Figure 10:
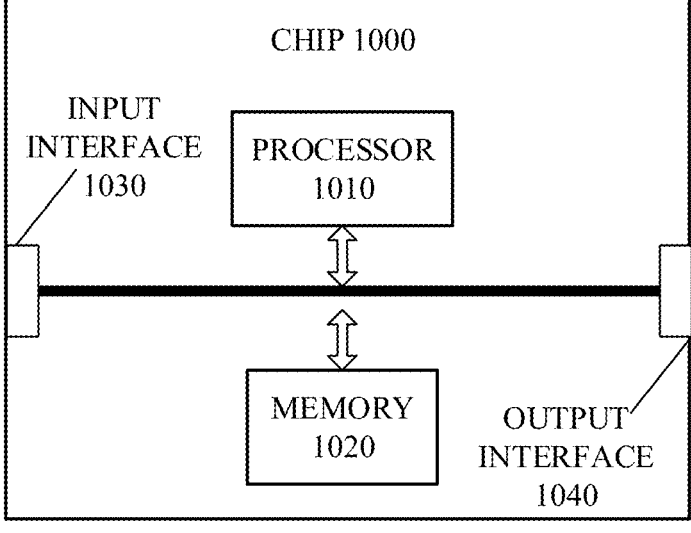
FIG. 10 is a schematic structural diagram of a chip according to implementations of the disclosure.

FIG. 10 is a schematic structural diagram of a chip according to implementations of the disclosure. The chip 1000 illustrated in FIG. 10 includes a processor 1010. The processor 1010 can invoke and execute computer programs stored in a memory to perform the method in implementations of the disclosure.

Optionally, as illustrated in FIG. 10, the chip 1000 further includes the memory 1020. The processor 1010 can invoke and execute the computer programs stored in the memory 1020 to perform the method in implementations of the disclosure.

The memory 1020 may be a separate device independent of the processor 1010, or may be integrated into the processor 1010.

Optionally, the chip 1000 may further include an input interface 1030. The processor 1010 can control the input interface 1030 to communicate with other devices or chips, specifically, to obtain information or data transmitted by other devices or chips.

Optionally, the chip 1000 may further include an output interface 1040. The processor 1010 can control the output interface 1040 to communicate with other devices or chips, specifically, to output information or data to other devices or chips.

Optionally, the chip is applicable to the network device in implementations of the disclosure. The chip can implement the operations performed by the network device in various methods in implementations of the disclosure, which will not be repeated herein for the sake of simplicity.

Optionally, the chip is applicable to the mobile terminal/ the terminal device in implementations of the disclosure. The chip can implement the operations performed by the mobile terminal/the terminal device in various methods in implementations in the disclosure, which will not be repeated herein for the sake of simplicity.

It should be understood that, the chip referred to in implementations of the disclosure may also be referred to as a system-on-chip (SOC).

Figure 11:
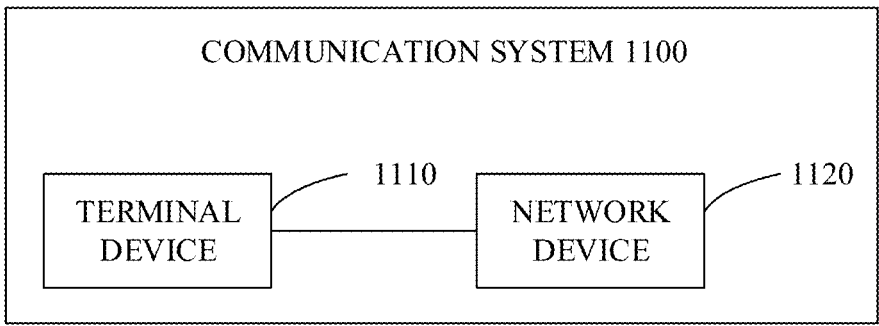
FIG. 11 is a schematic block diagram of a communication system provided in implementations of the disclosure.

FIG. 11 is a schematic block diagram of a communication system 1100 provided in implementations of the disclosure. As illustrated in FIG. 11, the communication system 1100 includes a terminal device 1110 and a network device 1120.

The terminal device 1110 can implement functions of the terminal device in the foregoing methods, and the network device 1120 can implement functions of the network device in the foregoing methods, which will not be repeated herein for the sake of simplicity.

It should be understood that, the processor in implementations of the disclosure may be an integrated circuit chip with signal processing capabilities. During implementation, each step of the foregoing method implementations may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations of the disclosure may be directly implemented by a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the memory above is intended for illustration rather than limitation. For example, the memory in implementations of the disclosure may also be an SRAM, a DRAM, an SDRAM, a DDR SDRAM, an ESDRAM, an SLDRAM, a DR RAM, etc. In other words, the memory in implementations of the disclosure is intended to include, but is not limited to, these and any other suitable types of memory.

Implementations of the disclosure further provide a computer-readable storage medium. The computer-readable storage medium is configured to store computer programs.

Optionally, the computer-readable storage medium is applicable to the network device of implementations of the disclosure. The computer programs are operable with a computer to implement the operations performed by the network device in various methods in implementations of the disclosure, which will not be repeated herein for the sake of simplicity.

Optionally, the computer-readable storage medium is applicable to the mobile terminal/the terminal device of implementations of the disclosure. The computer programs are operable with a computer to implement the operations performed by the mobile terminal/the terminal device in various methods in implementations of the disclosure, which will not be repeated herein for the sake of simplicity.

Implementations of the disclosure further provide a computer program product. The computer program product includes computer program instructions.

Optionally, the computer program product is applicable to the network device of implementations of the disclosure. The computer program instructions are operable with a computer to implement the operations performed by the network device in various methods in implementations of the disclosure, which will not be repeated herein for the sake of simplicity.

Optionally, the computer program product is applicable to the mobile terminal/the terminal device of implementations of the disclosure. The computer program instructions are operable with a computer to implement the operations performed by the mobile terminal/the terminal device in various methods in implementations of the disclosure, which will not be repeated herein for the sake of simplicity.

Implementations of the disclosure further provide a computer program.

Optionally, the computer program is applicable to the network device of implementations of the disclosure. The computer program, when executed by a computer, is operable with the computer to implement the operations performed by the network device in various methods in implementations of the disclosure, which will not be repeated herein for the sake of simplicity.

Optionally, the computer program is applicable to the mobile terminal/the terminal device of implementations of the disclosure. The computer program, when executed by a computer, is operable with the computer to implement the operations performed by the mobile terminal/the terminal device in various methods in implementations of the disclosure, which will not be repeated herein for the sake of simplicity.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the specific working processes of the foregoing systems, apparatuses, and units, reference can be made to the corresponding processes in the foregoing method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various implementations of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the related art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for improving reliability of multicast broadcast service (MBS) service, comprising:
determining, by a network device, that a transmission mode of an MBS service is: new transmission is transmitted in a point to multipoint (PTM) mode, and retransmission is transmitted in a point to point (PTP) mode; and
scheduling, by the network device, transmission of the MBS service based on the transmission mode of the MBS service, comprising:
scheduling, by the network device, new transmission of first service data in the PTM mode, wherein the first service data is service data of the MBS service; and/or
scheduling, by the network device, retransmission of the first service data in the PTP mode,
wherein scheduling, by the network device, new transmission of the first service data in the PTM mode comprises:
sending, by the network device, first downlink (DL) scheduling information scrambled by a group radio network temporary identity (G-RNTI), wherein the first DL scheduling information is used for scheduling new transmission of the first service data, and the first DL scheduling information carries a first hybrid automatic repeat request (HARQ) process identity (ID).

2. The method of claim 1, wherein scheduling, by the network device, retransmission of the first service data in the PTP mode comprises:
sending, by the network device, third DL scheduling information scrambled by a cell RNTI (C-RNTI), wherein the third DL scheduling information is used for scheduling retransmission of the first service data, and the third DL scheduling information carries the first HARQ process ID.

3. The method of claim 2, wherein a new data indication (NDI) carried in the third DL scheduling information is the same as an NDI carried in the first DL scheduling information.

4. The method of claim 1, wherein scheduling, by the network device, retransmission of the first service data in the PTP mode comprises:
scheduling, by the network device, retransmission of the first service data in the PTP mode to each of at least one terminal device, wherein the at least one terminal device is at least one terminal device in an MBS group.

5. The method of claim 4, wherein the at least one terminal device comprises:
at least one terminal device that feeds back HARQ negative acknowledgement (NACK) information regarding the first service data; and/or
at least one terminal device that does not feed back HARQ feedback information regarding the first service data.

6. The method of claim 1, further comprising:

scheduling, by the network device, new transmission of second service data in the PTM mode when HARQ ACK information regarding the first service data fed back by all terminal devices in an MBS group is received by the network device, wherein the second service data is data to be transmitted next to the first service data.

7. A network device, comprising:

a transceiver;

a processor; and a memory storing computer programs which, when executed by the processor, are operable with the processor to:

determine that a transmission mode of a multicast broadcast service (MBS) service is: new transmission is transmitted in a point to multipoint (PTM) mode, and retransmission is transmitted in a point to point (PTP) mode; and schedule transmission of the MBS service based on the transmission mode of the MBS service, wherein the processor is configured to: schedule new transmission of first service data in the PTM mode, wherein the first service data is service data of the MBS service; and/or schedule retransmission of the first service data in the PTP mode;

wherein the processor configured to schedule new transmission of the first service data in the PTM mode is configured to:

cause the transceiver to send first downlink (DL) scheduling information scrambled by a group radio network temporary identity (G-RNTI), wherein the first DL scheduling information is used for scheduling new transmission of the first service data, and the first DL scheduling information carries a first hybrid automatic repeat request (HARQ) process identity (ID).

8. The network device of claim 7, wherein the transceiver is configured to:

send third DL scheduling information scrambled by a cell RNTI (C-RNTI), wherein the third DL scheduling information is used for scheduling retransmission of the first service data, and the third DL scheduling information carries the first HARQ process ID.

9. The network device of claim 8, wherein a new data indication (NDI) carried in the third DL scheduling information is the same as an NDI carried in the first DL scheduling information.

10. The network device of claim 7, wherein the processor configured to schedule retransmission of the first service data in the PTP mode is configured to:

schedule retransmission of the first service data in the PTP mode to each of at least one terminal device, wherein the at least one terminal device is at least one terminal device in an MBS group.

11. The network device of claim 10, wherein the at least one terminal device comprises:

at least one terminal device that feeds back HARQ negative acknowledgement (NACK) information regarding the first service data; and/or at least one terminal device that does not feed back HARQ feedback information regarding the first service data.

12. The network device of claim 7, wherein the processor is further configured to:

schedule new transmission of second service data in the PTM mode when HARQ ACK information regarding the first service data fed back by all terminal devices in an MBS group is received by the network device, wherein the second service data is data to be transmitted next to the first service data.

\* \* \* \* \*